US008010152B2

(12) United States Patent
Kim (10) Patent No.: US 8,010,152 B2
(45) Date of Patent: Aug. 30, 2011

(54) MOBILE TERMINAL AND METHOD OF SWITCHING IDENTITY MODULES

(75) Inventor: Moosung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 12/368,878

(22) Filed: Feb. 10, 2009

(65) Prior Publication Data

US 2010/0069003 A1  Mar. 18, 2010

(30) Foreign Application Priority Data

Sep. 17, 2008  (KR) .......................... 10-2008-0090945

(51) Int. Cl.
 *H04M 1/00* (2006.01)
(52) U.S. Cl. .................. 455/552.1; 455/551; 455/553.1
(58) Field of Classification Search ............... 455/550.1, 455/551.1, 552.1, 553.1
See application file for complete search history.

(56) References Cited

U.S. PATENT DOCUMENTS

| 7,912,497 B2 * | 3/2011 | Isidore et al. | 455/552.1 |
| 7,929,993 B2 * | 4/2011 | Nagarajan | 455/558 |
| 2008/0020773 A1 * | 1/2008 | Black et al. | 455/445 |
| 2010/0304782 A1 * | 12/2010 | Chang et al. | 455/552.1 |

* cited by examiner

*Primary Examiner* — James H Cho
(74) *Attorney, Agent, or Firm* — Lee, Hong, Degerman, Kang & Waimey

(57) ABSTRACT

A mobile terminal includes a first and a second identity module in which user information is stored. A first controller for controlling wireless communication based on user information is connected to either the first or the second identity module. A second controller for controlling wireless communication through a second wireless communication unit is connected to the other identity module. An switch connects one of the first or second identity modules to one of the first or second controllers, and optionally, connects the other identity module to the other controller responsive to a manual command or a service event such as a multimedia message, a short-range communication, a wireless Internet connection, a broadcast reception, or receipt of position information.

19 Claims, 6 Drawing Sheets

MOBILE TERMINAL AND METHOD OF SWITCHING IDENTITY MODULES

CROSS REFERENCE TO RELATED APPLICATIONS

Pursuant to 35 U.S.C. §119(a), this application claims the benefit of earlier filing date and right of priority to Korean Application No. 10-2008-0090945 filed on Sep. 17, 2008, the contents of which are hereby incorporated by reference in their entirety.

FIELD OF THE INVENTION

The present invention relates to a mobile terminal and a method of connecting identity modules that can switch connections between controllers and identity modules.

DISCUSSION OF THE RELATED ART

A terminal such as a personal computer (PC), a laptop computer, and a mobile phone may include a multimedia player for reproducing audio and video files, playing games, and receiving multimedia broadcasts. A terminal is classified into a mobile or stationary according to its mobility, and is classified as a handheld terminal or a vehicle mounted terminal according to its portability.

In order increase the functionality of a terminal, improvements to the terminal structure and software are continually being made.

Allowing one mobile terminal to connect to different mobile communication networks and thereby providing various communication services has been studied. To accomplish this, two separate subscriber identify module (SIM) cards having user information are installed in the mobile terminal. However, because switching technology for connecting subscriber identify modules to the mobile communication network is incomplete, improvements of the switching technology are required. One method of switching technology of subscriber identify modules includes a re-booting process that involves turning off and turning on the power of the mobile terminal. Another method of switching technology for selectively connecting two subscriber identify modules to one mobile communication network without a re-booting process exists, however because only one of two phone numbers can be connected to one mobile communication network with a software switching method, only one communication service can be provided at a time.

SUMMARY OF THE INVENTION

The exemplary embodiments of present application have been made in view of the above problems, and provide a mobile terminal and a method of connecting identity modules that can switch a plurality of identity modules without rebooting the terminal thereby enabling the terminal connecting with different mobile communication networks.

In accordance with an embodiment of the present disclosure, a mobile terminal includes a first and a second identity module in which user information is stored, a first controller for controlling wireless communication based on user information from one of the first and the second identity modules through a first wireless communication unit, a second controller for controlling wireless communication based on user information from the other one of the first and second identity modules through a second wireless communication unit, and an identity module switch for switching connections between the first and the second identity modules and the first and the second controllers.

In accordance with another embodiment of the present disclosure, a method of connecting identity modules of a mobile terminal having a first and a second identity module in which user information is stored includes connecting one of the first and second identity modules to a first controller for controlling wireless communication through a first wireless communication unit, connecting the other one of the first and second identity modules to a second controller for controlling wireless communication through a second wireless communication unit, and switching connections between the first and the second identity modules and the first and the second controllers.

Further scope of applicability of the present invention will become apparent from the detailed description and the drawings. However, it should be understood that the detailed description and specific examples, while indicating embodiments of the invention, are given by illustration only, since various changes and modifications within the spirit and scope of the invention will become apparent to those skilled in the art from this detailed description.

BRIEF DESCRIPTION OF THE DRAWINGS

The invention will be described in detail with reference to the following drawings in which like numerals refer to like elements. The accompany drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal according to the present invention is described in detail with reference to the drawings. In the following description, suffixes "module" and "unit" of constituent elements are provided for easily describing a specification, instead of having a distinctive meaning or function.

The mobile terminal may include a mobile phone, a smart phone, a laptop computer, a digital broadcasting terminal, a personal digital assistant (PDA), a portable multimedia player (PMP), and a navigation terminal.

Figure 1:
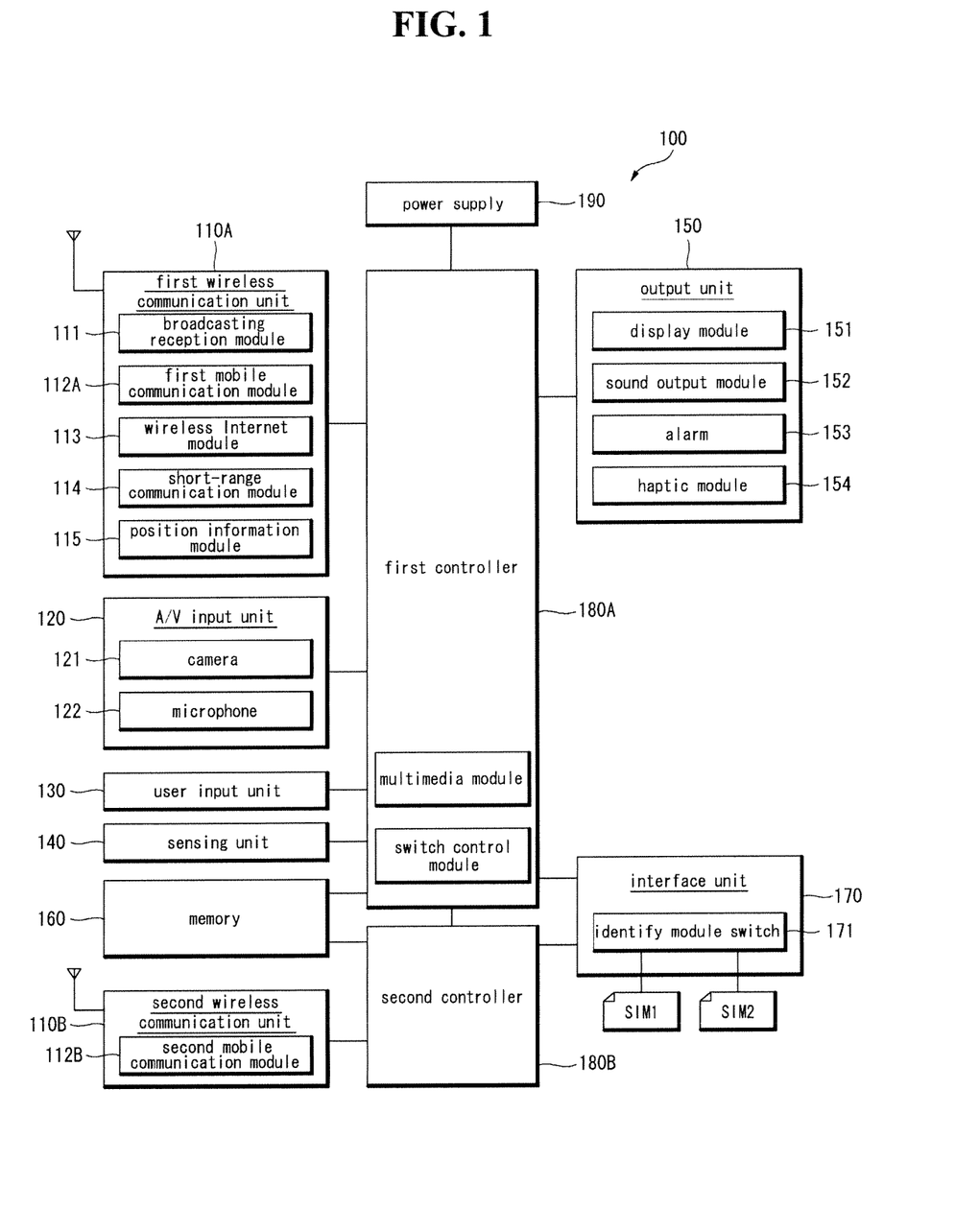
FIG. 1 is a block diagram of a mobile terminal according to an exemplary embodiment of the present disclosure.

FIG. 1 is a block diagram of a mobile terminal according to an exemplary embodiment of the present disclosure.

The mobile terminal 100 includes a first wireless communication unit 110A, a second wireless communication unit 110B, an audio/video (A/V) input unit 120, a user input unit 130, a sensing unit 140, an output unit 150, a memory 160, an interface unit 170, a first controller 180A, a second controller 180B, and a power supply 190. Because various units shown in FIG. 1 are not essential, the mobile terminal 100 may include constituent units greater or fewer units than those shown in FIG. 1.

The first wireless communication unit 110A includes at least one module for allowing wireless communication between the mobile terminal 100 and a wireless communication system, or between the mobile terminal 100 and a network at which the mobile terminal 100 is positioned by the control of the first controller 180A. For this, the first wireless communication unit 110A includes at least one of a first mobile communication module 112A, a broadcasting reception module 111, a wireless Internet module 113, a short-range communication module 114, and a position information module 115.

The broadcasting reception module 111 receives a broadcasting signal and/or broadcasting related information from an external broadcasting management server through a broadcasting channel.

The broadcasting channel includes a satellite channel and a terrestrial channel. The broadcasting management server may be a server for generating and transmitting a broadcasting signal and/or broadcasting related information, or a server for receiving the generated broadcasting signal and/or broadcasting related information and for transmitting the received broadcasting signal and/or broadcasting related information to the terminal. The broadcasting signal may include a television broadcasting signal, a radio broadcasting signal, a data broadcasting signal, and a broadcasting signal in which the data broadcasting signal is coupled to the television broadcasting signal or the radio broadcasting signal.

The broadcasting related information may be information related to a broadcasting channel, a broadcasting program, or a broadcasting service provider. The broadcasting related information may be provided through a mobile communication network. In this case, the broadcasting related information may be received by the first mobile communication module 112A.

The broadcasting related information may exist in various forms. For example, the broadcasting related information may exist in a form of an electronic program guide (EPG) of digital multimedia broadcasting (DMB), or an electronic service guide (ESG) of digital video broadcast-handheld (DVB-H).

The broadcasting reception module 111 receives a broadcasting signal using various broadcasting systems and may receive a digital broadcasting signal using a digital broadcasting system such as digital multimedia broadcasting-terrestrial (DMB-T), digital multimedia broadcasting-satellite (DMB-S), media forward link only (MediaFLO), digital video broadcast-handheld (DVB-H), and integrated services digital broadcast-terrestrial (ISDB-T). Further, the broadcasting reception module 111 may be formed to be appropriate to other broadcasting systems for providing a broadcasting signal as well as the above-described digital broadcasting system.

The broadcasting signal and/or the broadcasting related information received through the broadcasting reception module 111 may be stored in the memory 160.

The first mobile communication module 112A transmits and receives a wireless signal with at least one of an external terminal and server through a base station of a mobile communication network. The wireless signal may include various forms of data according to transmission and reception of a voice call signal, an audiovisual communication call signal, or a character/multimedia message.

The wireless Internet module 113 is a module for connecting wireless Internet and may be provided inside or outside of the mobile terminal 100. As wireless Internet technology, wireless LAN (WLAN) (Wi-Fi), wireless broadband (Wibro), world interoperability for microwave access (Wimax), and high speed downlink packet access (HSDPA) may be used.

The short-range communication module 114 is a module for short-range communication. As short-range communication technology, Bluetooth®, radio frequency identification (RFID), infrared data association (IrDA), ultra wideband (UWB), and ZigBee® may be used.

The position information module 115 is a module for checking or obtaining a position of the mobile terminal 100. A typical position information module is a global position system (GPS) module. According to current technology, the GPS module 115 calculates three-dimensional (3D) position information according to a latitude, a longitude, and an altitude of one point (object) at one time point by calculating information about a distance in which one point (object) is separated from three or more satellites and information about a measured time point of the distance information and then applying trigonometry to the calculated distance information. Further, a method of calculating information about a position and a time point using three satellites and adjusting an error of the calculated position and time point using another satellite is used. The GPS module 115 continuously calculates a current position in real time and calculates speed information using the calculated positions.

The second wireless communication unit 110B is connected to a base station of a mobile communication network to perform wireless communication by the control of the second controller 180B. For this, the second wireless communication unit 110B includes a second mobile communication module 112B. Further, the second wireless communication unit 110B may include at least one of a broadcast reception module, a wireless Internet module, a short-range communication module, and a position information module.

The second mobile communication module 112B transmits and receives a wireless signal with at least one of an external terminal and server through a base station of a mobile communication network. The wireless signal includes various forms of data according to transmission and reception of a voice call signal, an audiovisual communication call signal, or a character/multimedia message.

An antenna of the first mobile communication module 112A and an antenna of the second mobile communication module 112B are separated by a predetermined distance in order to reduce signal interference.

The A/V input unit 120 is used for inputting an audio signal or a video signal and includes a camera 121 and a microphone 122. The camera 121 processes an image frame of a still image or a moving image obtained by an image sensor in an audiovisual communication mode or a photographing mode. The processed image frame may be displayed in the display module 151.

The image frame processed in the camera 121 may be stored in the memory 160, or transmitted to the outside through the wireless communication unit 110. According to a configuration of the mobile terminal 100, two or more cameras 121 may be provided.

The microphone 122 receives an external sound signal and processes the external sound signal to electrical sound data in a communication mode, a recording mode, or a voice recognition mode. The processed sound data are converted to a form that can be transmitted and are output to a mobile communication base station through the mobile communication module 112 in a communication mode. The microphone 122 has various noise removal algorithms in order to remove noise generated when receiving an external sound signal.

The user input unit 130 is used for inputting data controlling an operation of the mobile terminal 100 by a user. The user input unit 130 includes a keypad, a dome switch, a touch pad (static pressure/static electricity), a jog wheel, and a jog switch.

The sensing unit 140 detects a current state of the mobile terminal 100 such as an opening or closing state of the mobile terminal 100, a position of the mobile terminal 100, a user contact, an orientation of the mobile terminal 100, and acceleration/deceleration of the mobile terminal 100 and generates a sensing signal controlling an operation of the mobile terminal 100. For example, when the mobile terminal 100 has a slide phone form, the sensing unit 140 detects an opening or closing state of a slide phone. Further, the sensing unit 140 may perform a sensing function related to power supply of the power supply 190 and coupling of the interface unit 170 to external appliances. The sensing unit 140 may include a proximity sensor.

The output unit 150 generates the output related to visual sense, hearing sense, or tactile sense and includes a display module 151, a sound output module 152, an alarm 153, and a haptic module 154.

The display module 151 displays information processed in the mobile terminal 100. For example, when the mobile terminal 100 is in a communication mode, the display module 151 displays a user interface (UI) or a graphic user interface (GUI) related to communication. The UI and the GUI may be embodied with a two-dimensional image or a three-dimensional image. When the mobile terminal 100 is in an audiovisual communication mode or a photographing mode, the mobile terminal 100 displays the photographed or/and received image, the UI, and GUI.

The display module 151 may include at least one of a liquid crystal display (LCD), a thin film transistor-liquid crystal display (TFT-LCD), an organic light-emitting diode, a flexible display, and a 3D display.

In order to view the outside through the display, some display may be formed in a transparent type or a light transmitting type. This is called a transparent display, and a typical transparent display is a transparent LCD. A rear structure of the display module 151 may be also formed in a light transmitting type structure. Due to such a structure, the user can view an object positioned at the rear side of a terminal body through an area of the display module 151 of the terminal body.

According to an implementation of the mobile terminal 100, two or more display modules 151 may exist. For example, in the mobile terminal 100, a plurality of display units may be disposed apart at one surface, be integrally disposed, or be each disposed at different surfaces.

When the display module 151 and a sensor ('touch sensor') for detecting a touch operation are formed in an interlayer structure ('touch screen'), the display module 151 can be used as an input device as well as an output device. The touch sensor may have a form such as a touch film, a touch sheet, and a touch pad.

The touch sensor can convert the change of a pressure applied to a specific portion of the display module 151, or the change of capacitance occurred in a specific portion of the display module 151 to an electrical input signal. The touch sensor can detect a touched position, a touched area, and a touched pressure.

When a touch is input to the touch sensor, a signal corresponding thereto is transmitted to a touch control module (not shown) within the first controller 180A. The touch control module generates data corresponding to the touch signal. Accordingly, the first controller 180A can know a touch area of the display module 151, recognize a long touch and a short touch by counting a touch time period, and recognize a touch form such as dragging or flicking.

A proximity sensor may be disposed in an internal area of the mobile terminal 100 surrounded by the touch screen, or at a periphery of the touch screen. The proximity sensor is a sensor for detecting an object approaching a predetermined detection surface, or an object existing at a periphery thereof using an electromagnetic field force or infrared without a mechanical contact. The proximity sensor has a longer lifetime than and is used more widely than a contact sensor. The proximity sensor includes, for example, a transmissive type photoelectric sensor, a direct reflective type photoelectric sensor, a mirror reflective type photoelectric sensor, a high frequency oscillation type proximity sensor, a capacitance type proximity sensor, a magnetic type proximity sensor, and an infrared ray proximity sensor.

A capacitance type touch screen detects the approach of the pointer with the change of an electric field according to the approach of a pointer on the touch screen. In this case, the touch screen (touch sensor) may be classified into a proximity sensor.

The proximity sensor detects an approaching touch and an approaching touch pattern (for example, an approaching touch distance, an approaching touch direction, an approaching touch speed, an approaching touch time period, an approaching touch position, and an approaching touch moving state) Information corresponding to the detected approaching touch operation and approaching touch pattern may be output on the touch screen.

The sound output module 152 may output audio data received from the wireless communication unit 110, or stored in the memory 160 in a call signal reception mode, a communication mode or a recording mode, a voice recognition mode, and a broadcasting reception mode. The sound output module 152 outputs a sound signal related to a function (for example, call signal reception sound and message reception sound) performed in the mobile terminal 100. The sound output module 152 may include a receiver, a speaker, and a buzzer.

The alarm 153 outputs a signal for notifying occurrence of an event in the mobile terminal 100. An event occurred in the mobile terminal 100 includes, for example, call signal reception, message reception, key signal input, and touch input. The alarm 153 may output a signal for notifying occurrence of an event with vibration in addition to a video signal or an audio signal. The video signal or the audio signal may be output through the display module 151 or the sound output module 152.

The haptic module 154 generates various haptic effects that a user can feel. A typical haptic effect generated by the haptic module 154 is vibration. Intensity and a pattern of vibration generated by the haptic module 154 can be adjusted. For example, the haptic module 154 may synthesize and output different vibration, or sequentially output different vibration.

The haptic module 154 may generate various haptic effects such as a stimulation effect due to arrangement of pins vertically moving relative to a skin contact surface, a stimulation effect using an injection force or an inhalation force of air through an injection nozzle or an inhalation nozzle, a stimulation effect due to grazing of a skin surface, a stimulation effect through a contact of an electrode, a stimulation effect using an electrostatic force, and a stimulation effect due to reproduction of cold and warmth feeling using an element that can absorb or emit heat, in addition to vibration.

The haptic module 154 transmits a haptic effect through a direct contact and may be embodied to feel a haptic effect through muscular sense of as a user's finger or arm. According to a configuration of the mobile terminal 100, two or more haptic modules 154 may be provided.

The memory 160 stores a program for operating the first and second controllers 180A and 180B and may temporarily store input/output data (for example, a phonebook, a message, a still image, and a video). The memory 160 may store data about various patterns of vibration and sound to be output when touching the touch screen.

The memory 160 may include at least one of a flash memory type, a hard disk type, a multimedia card micro type, and a card type memory (for example, secure digital (SD) memory or extreme digital(XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The memory 160 is commonly connected to the first and second controllers 180A and 180B, and used for the first and second controllers 180A and 180B and may be divided for independently connecting to the first and second controllers 180A and 180B.

The interface unit 170 functions as a passage for all external appliances connected to the mobile terminal 100. The interface unit 170 receives data or power from the external appliances to transfer the data or power to constituent units within the mobile terminal 100, or transmits data within the mobile terminal 100 to external appliances. For example, the interface unit 170 may include a wired/wireless headset port, an external charger port, a wired/wireless data port, a memory card port, an identity module card port, an audio input/output (I/O) port, a video I/O port, and an earphone port. The identity module card port is formed in plural within the mobile terminal 100 such that a plurality of identity modules may be mounted in the mobile terminal 100.

Identity modules that are inserted into each of the identity module card ports are chips for storing various information for certifying user authority of the mobile terminal 100 and may include a user identify module (UIM), a SIM, and an universal subscriber identify module (USIM). The identity modules that are installed in the mobile terminal 100 may be the same kind of identity modules, or different kinds of identity modules. The identity modules may be manufactured in a smart card form that can be inserted into an identity module card port. Therefore, the identity modules can be connected to the mobile terminal 100 through the identity module card ports. Different user information may be stored in each of the identity modules. The user information includes a phone number, communication information, and accounting information.

The mobile terminal 100 can detachably install at least one identity modules and switch identity modules connected to the base stations of a plurality of mobile communication networks without a rebooting process using an identity module switch 171. In FIGS. 1 to 5, a SIM is illustrated as the identity module, however the identity module is not limited thereto and may include an UIM or an USIM.

The identity module switch 171 selects an identity module connected to the first controller 180A and an identity module connected to the second controller 180B by the control of the first controller 180A or the second controller 180B. The identity module switch 171 is described in detail with reference to FIGS. 3 to 5.

When the mobile terminal 100 is connected to an external cradle, the interface unit 170 may become a passage for supplying power from the cradle to the mobile terminal 100, or become a passage for transferring various instruction signals input to the cradle by a user to the mobile terminal 100. Various instruction signals or power input from the cradle may be used as a signal for recognizing that the mobile terminal 100 is accurately mounted in the cradle.

The first controller 180A operates as a master control system controlling general operations of the mobile terminal 100. For example, the first controller 180A performs various signal processing related to voice communication, data communication, and audiovisual communication through the first wireless communication unit 110A and controls the A/V input unit 120, the user input unit 130, the sensing unit 140, the output unit 150, and the memory 160. The first controller 180A may relay a connection between the A/V input unit 120, the user input unit 130, the sensing unit 140, and the output unit 150 and the second controller 180B by a request of the second controller 180B. The first controller 180A may include a multimedia module for reproducing multimedia. The multimedia module may be provided within the first controller 180A, or may be provided separately from the first controller 180A. Further, the first controller 180A may include a switch control module controlling the identity module switch 171.

The switch control module is provided within the first controller 180A in FIG. 1. However a position of the switch control module is not limited and may be provided in the second controller 180A. Further, the switch control module may be independently formed from the first and second controllers 180A and 180B to control the identity module switch 171 by the control of one of the controllers 180A and 180B.

The first controller 180A can perform a pattern recognition processing that can recognize cursive input or drawing input performed on a touch screen with a character or an image.

The second controller 180B operates by a slave control system. The second controller 180B performs various signal processing related to voice communication, data communication, and audiovisual communication through the second wireless communication unit 110B and controls the A/V input unit 120, the user input unit 130, the sensing unit 140, and the output unit 150 by relay of the first controller 180A.

The power supply 190 receives external power and internal power to supply power to constituent units requiring power in the mobile terminal 100 by the control of the first controller 180A.

The mobile terminal 100 connects a first identity module SIM1 to the first controller 180A, connects a second identity module SIM2 to the second controller 180B, and is connected to at least one mobile communication network through the first and second wireless communication units 110A and 110B. In this case, the mobile terminal 100 is connected to a first mobile communication network through the first wireless communication unit 110A based on user information of the first identity module SIM1 and is connected to a second mobile communication network through the second wireless communication unit 110B based on user information of the second identity module SIM2.

The mobile terminal 100 can automatically change connections between the identity modules SIM1 and SIM2 and the controllers 180A and 180B by controlling the identity module switch 171 without re-booting. In this case, the second identity module SIM2 is connected to the first controller 180A, and the first identity module SIM1 is connected to the second controller 180B. The first controller 180A can initiate the change based upon, for example, at least one of a multimedia message service (MMS), a short-range communication service, a wireless Internet connection service, a broadcast reception service, a position information reception service. Because the multimedia module, the short-range communication module 114, the broadcast reception module 111, and the position information module 115 are connected to the first controller 180A, the second controller 180B does not initiate the change. A user input is often used to initiate a change of the second identity module SIM2, and the mobile terminal 100 connects the second identity module SIM2 to the first controller 180A by switching the identity module switch 171, thereby providing a service using information of the second identity module.

In other words, when the mobile terminal 100 is connected to the second mobile communication network 300 using information of the second identity module SIM2, a change of connections can be executed by the first controller 180A but not by the second controller 180B. Upon executing a change of service, the mobile terminal 100 selectively connects the second identity module SIM2 to the first controller 180A. Therefore, the mobile terminal 100 can provide a service that can be executed by the first controller 180A using user information of the second identity module SIM2 connected to the second mobile communication network 300.

Various exemplary embodiments according to the present invention are performed using software, hardware, or a combination thereof and can be embodied within a record medium that can be read with a computer or devices similar thereto.

When exemplary embodiments are performed using hardware, the controllers 180A and 180B may include at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for executing a function.

When exemplary embodiments are performed using software, exemplary embodiments such as a procedure and a function can be performed with a separate software module for performing at least one function or operation. A software code can be performed by a software application prepared with an appropriate programming language. Further, the software code is stored in the memory 160 and executed by the controller 180.

Figure 2A:
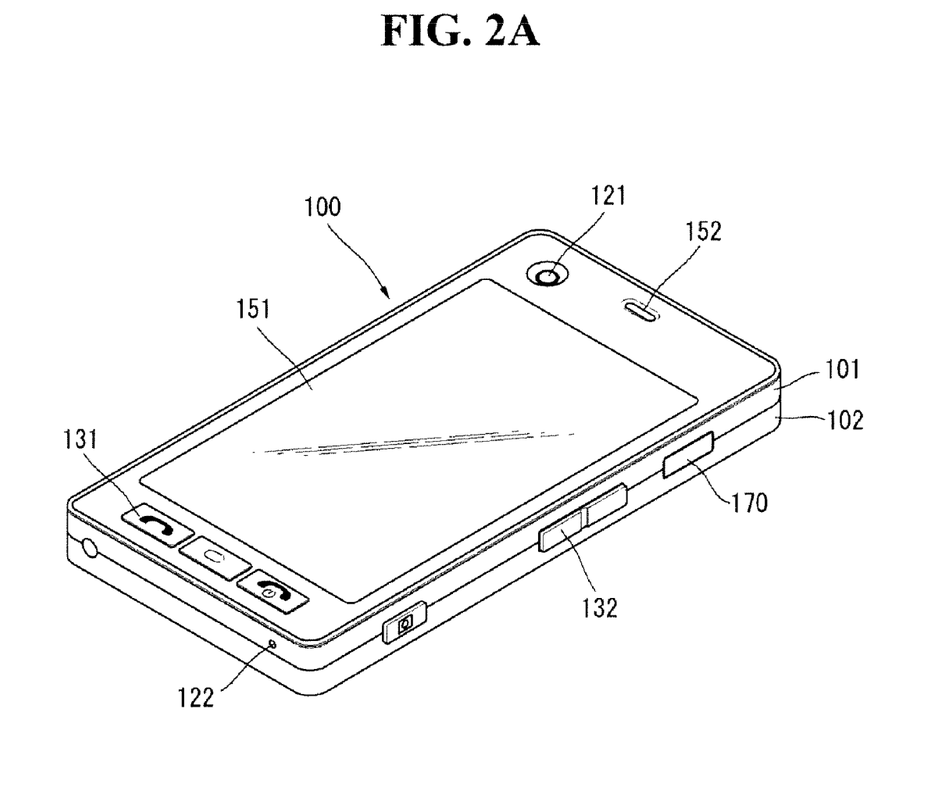
FIG. 2A is a front perspective view of a mobile terminal according to an exemplary embodiment of the present disclosure.

FIG. 2A is a front perspective view illustrating an example of the mobile terminal 100.

The mobile terminal 100 has a bar type terminal body. The present invention is not limited thereto and may have various structures such as a slide type, a folder type, a swing type, and a swivel type in which two or more bodies are coupled to perform relative movement.

The terminal body includes a case (a casing, a housing, a cover, etc.) for forming external appearance. In this exemplary embodiment, the case is divided into a front case 101 and a rear case 102. Various electronic components are provided in space formed between the front case 101 and the rear case 102. At least one intermediate case may be additionally disposed between the front case 101 and the rear case 102.

The cases may be manufactured by injecting synthetic resin, or be made of a metal material such as stainless steel (STS) or titanium (Ti).

In the front case 101 of the terminal body, the display module 151, the sound output module 152, the camera 121, manipulation units 131 and 132, the microphone 122, and the interface unit 170 are disposed. The manipulation units 131 and 132 are used for inputting an instruction for controlling an operation of the mobile terminal 100 and may include a plurality of manipulating units 131 and 132. The manipulating units 131 and 132 may be called a manipulating portion and may adapt any method that can be driven in a tactile manner in which a user can feel conversion of tactile sense.

The display module 151 occupies most of the front case 101. The sound output module 152 and the camera 121 are disposed at an area adjacent to one end portion of both end portions of the display module 151, and the first manipulating unit 131 and the microphone 122 of the manipulation units 131 and 132 are disposed at an area adjacent to the other end portion thereof. The interface unit 170 and the second manipulating unit 132 of the manipulation units 131 and 132 are disposed at side surfaces of the front case 101 and the rear case 102, and some interface such as a slot of an identity module card port or the memory card may be disposed around battery mounting space covered by the front case.

Content input by the manipulating units 131 and 132 may be variously set. For example, the first manipulating unit 131 may receive an instruction such as start, end, and scroll, and the second manipulating unit 132 may receive an instruction such as magnitude adjustment of sound output from the sound output module 152, or conversion of a mode of the display module 151 to a touch recognition mode.

Figure 2B:
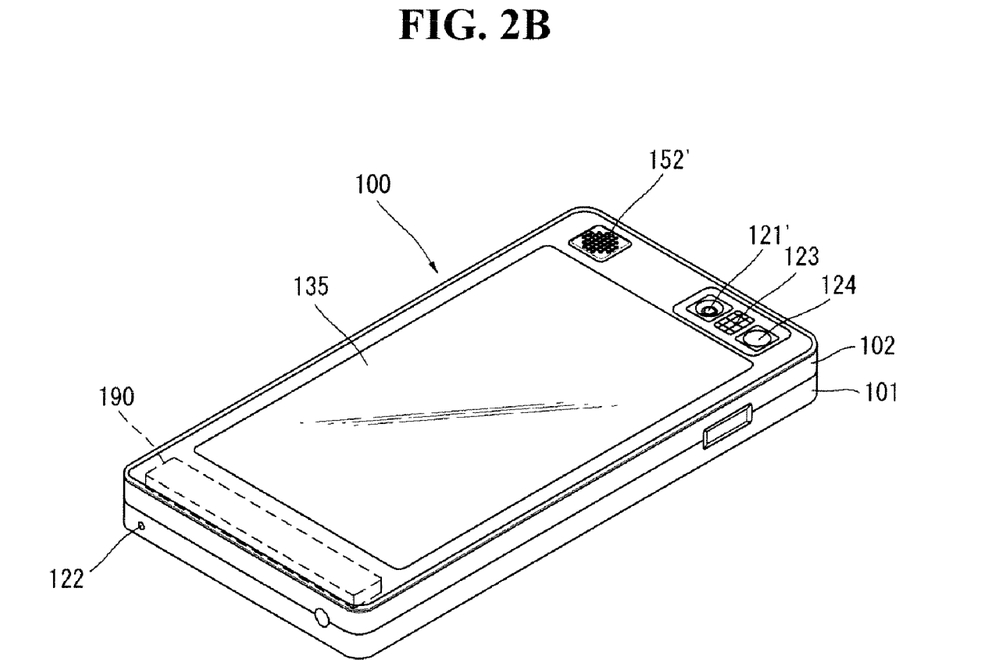
FIG. 2B is a rear perspective view of a mobile terminal according to an exemplary embodiment of the present disclosure.

FIG. 2B is a rear perspective view of the mobile terminal 100 shown in FIG. 2A. Referring to FIG. 2B, a camera 121' may be additionally mounted in a rear surface, i.e. in the rear case 102 of the terminal body. The camera 121' camera has a photographing direction substantially opposite to the front camera 121 (see FIG. 2A) and may have a pixel different from that of the camera 121.

For example, it is preferable that the camera 121 has a lower resolution for photographing a user's face and transmitting the photographed face to another party when performing audiovisual communication, and the camera 121' has a higher resolution because the camera 121' is generally used for photographing a general subject and for not transmitting the photographed subject. The cameras 121 and 121' may be provided in the terminal body for rotating or popping up.

A flashlight 123 and a mirror 124 may be additionally disposed adjacently to the camera 121'. When photographing a subject with the camera 121', the flashlight 123 emits light toward the subject. When the user photographs himself using the camera 121', the mirror 124 is used for viewing his face.

A sound output module 152' may be additionally disposed at the rear surface of the terminal body. The sound output module 152' can embody a stereo function together with the front sound output module 152 (see FIG. 2A) and may be used for embodying a speakerphone mode upon communicating.

In a side surface of the terminal body, a broadcasting signal reception antenna in addition to an antenna for communication may be additionally disposed. An antenna for forming a part of the broadcasting reception module 111 of FIG. 1 may be installed to be withdrawn from the terminal body.

The power supply 190 for supplying power to the mobile terminal 100 is mounted in the terminal body. The power supply 190 is provided within the terminal body, or is detachably provided at the outside of the terminal body.

A touch pad 135 for detecting a touch may be additionally mounted in the rear case 102. Similarly to the display module 151, the touch pad 135 may be formed in a light transmitting type. In this case, if the display module 151 is formed to output viewing information from both surfaces, the viewing information may be recognized through the touch pad 135. All information output from the both surfaces may be controlled by the touch pad 135. Alternatively, as a display is additionally mounted in the touch pad 135, a touch screen may be disposed even at the rear case 102.

The touch pad 135 cooperates with the display module 151 of the front case 101. The touch pad 135 is disposed in parallel to the rear side of the display module 151. The touch pad 135 may have a size equal to or smaller than that of the display module 151.

Figure 3:
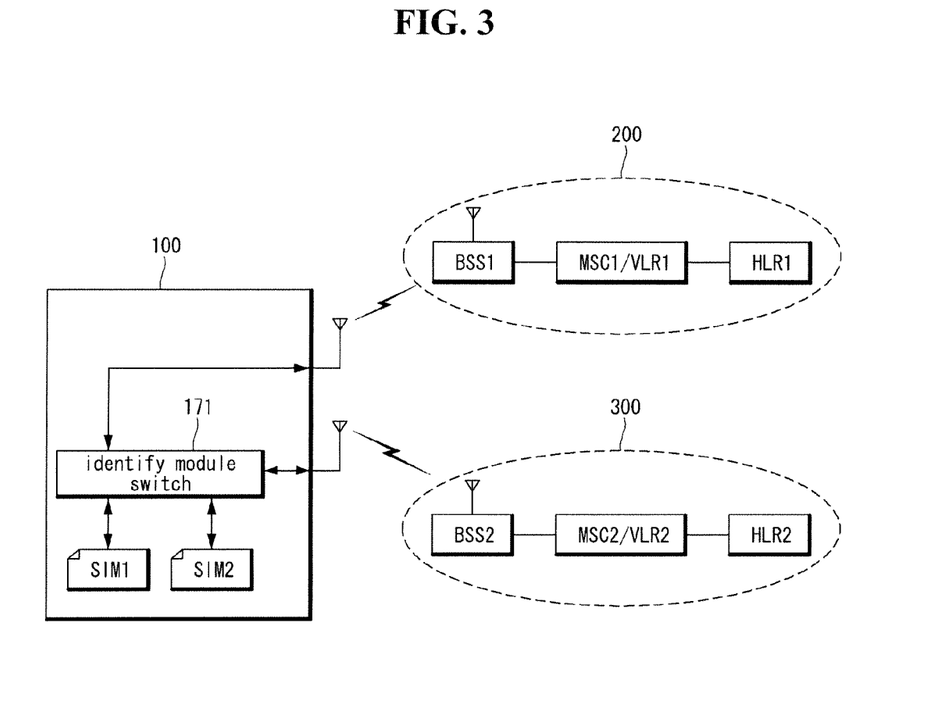
FIG. 3 illustrates a connection operation between a mobile terminal and a mobile communication network based on user information of identity modules shown in FIG. 1.

FIG. 3 is a diagram illustrating a connection state between the mobile terminal 100 and the mobile communication networks 200 and 300 according to an exemplary embodiment.

Referring to FIG. 3, the identity module switch 171 of the mobile terminal 100 connects the first identity module SIM1 to the first controller 180A and the second identity module SIM2 to the second controller 180B. The first wireless communication unit 110A is connected to the first mobile communication network 200 using user information of the first identity module SIM1. The second wireless communication unit 110B is connected to the second mobile communication network 300 using user information of the second identity module SIM2.

The first mobile communication network 200 includes a base station BSS1, a mobile switching center MSC1, a visitor location register VLR1, a home location register HLR1 and is connected to the mobile terminal 100 through a transmission band of a digital mobile phone system of a global system for mobile telecommunication (GSM) system, or a digital mobile phone system of a code division multiple access (CDMA) system.

The second mobile communication network 300 includes a base station BSS2, a mobile switching center MSC2, a visitor location register VLR2, and a home location register HLR2 and is connected to the mobile terminal 100 through a transmission band of a digital mobile phone system of a GSM or CDMA system.

The digital mobile phone system applied to the first and second mobile communication networks 200 and 300 may be the same or different type. A mobile communication service provider for providing a mobile communication service through the first mobile communication network 200 and a mobile communication service provider for providing a mobile communication service through the second mobile communication network 300 may be the same or different.

If the user initiates the change of identity modules through UI/GUI displayed in the display module 151, or through the user input unit 130, or if an event occurs in which conversion of identity modules is necessary, the identity module switch 171 switches the connections between the identity modules SIM1 and SIM2 and the controllers 180A and 180B connecting the second identity module SIM2 to the first controller 180A and the first identity module SIM1 to the second controller 180B. Accordingly, the first wireless communication unit 110A is now connected to the first mobile communication network 200 using user information of the second identity module SIM2. The second wireless communication unit 110B is now connected to the second mobile communication network 300 using user information of the first identity module SIM1.

Figure 4:
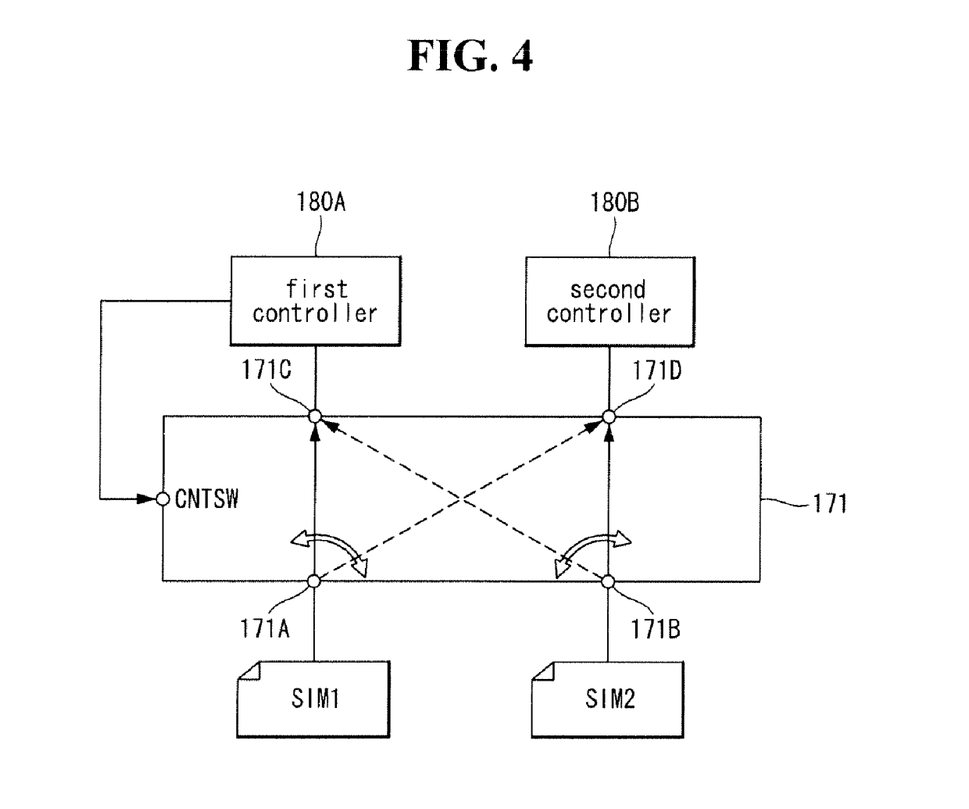
FIG. 4 illustrates an operation example of an identity module switch shown in FIGS. 1 to 2B.

FIG. 4 is a diagram illustrating an operation of the identity module switch 171. Referring to FIG. 4, a switch control signal of the first controller 180A or the second controller 180B is provided to a control terminal CNTSW of the identity module switch 171. A first identity module connection terminal 171A of the identity module switch 171 is connected to an output terminal of a first identity module card port for inserting the first identity module SIM1, and a second identity module connection terminal 171B of the identity module switch 171 is connected to an output terminal of a second identity module card port for inserting the second identity module SIM2. A first controller connection terminal 171C of the identity module switch 171 is connected to an identity module information input terminal of the first controller 180A, and a second controller connection terminal 171D of the identity module switch 171 is connected to an identity module information input terminal of the second controller 180B.

If the switching of identity modules is manually initiated, or if a service event initiates the switching, the identity module switch 171 changes the first identity module connection terminal 171A from the first controller connection terminal 171C to the second controller connection terminal 171D and the second identity module connection terminal 171B from the second controller connection terminal 171D to the first controller connection terminal 171C. The identity module switch 171 switches the connections of the identity modules SIM1 and SIM2 between the controllers 180A and 180B.

The original configuration can be restored either by manually initiating switching of the identity modules or by receiving a service event that initiates the switching. Upon switching, the identity module switch connects the first identity module connection terminal 171A to the first controller connection terminal 171C, and connects the second identity module connection terminal 171B to the second controller connection terminal 171D, thereby connecting SIM1 and SIM2 identity modules respectively to the controllers 180A and 180B.

Figure 5:
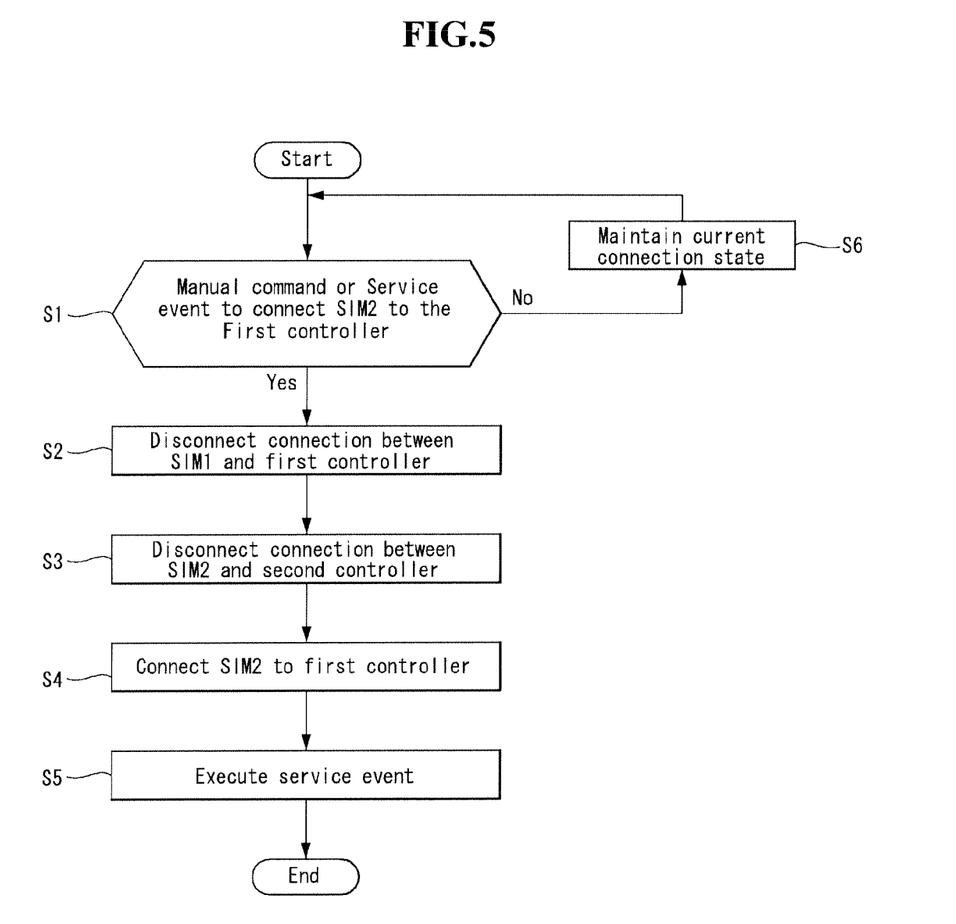
FIG. 5 is a flowchart illustrating a control process for converting identity modules according to an exemplary embodiment of the present disclosure.

FIG. 5 is a flowchart illustrating the process of switching identity modules according to an exemplary embodiment. The identity module switching method is performed according to a manual selection or in response to a service event without re-booting off of the mobile terminal 100 and is performed between the controllers 180A and 180B, the identity module switch 171, and the identity modules SIM1 and SIM2 by the control of the first controller 180A or the second controller 180B.

Referring to FIG. 5, the controller 180A or 180B determines whether a manual switch is initiated, or whether a service event requires switching the identity modules. If switching is initiated, the controller 180A or 180B disconnects the first identity module SIM1 from the first controller 180A (S2), and disconnects the second identity module SIM2 from the second controller 180B (S3) by controlling the identify module switch 171. If the switching of the identity modules is not initiated either manually or by a service event, no switching occurs and the existing connections of the identity modules to the controllers is maintained.

As a result, a connection between the mobile terminal 100 and the first mobile communication network 200 using user information of the first identity module SIM1 is terminated and a connection between the mobile terminal 100 and the second mobile communication network 300 using user information of the second identity module SIM2 is terminated. The service event requiring switching of the identity modules includes at least one of a multimedia message service, a short-range communication service, a wireless Internet connection service, a broadcasting reception service, and a position information reception service that can be processed by the first controller 180A.

The controller 180A or 180B connects the second identity module SIM2 to the first controller 180A by switching the identity module switch 171 (S4). In this case, the first identity module SIM1 is disconnected from the controllers 180A and 180B, or is connected to the second controller 180B (S5). When the second identity module SIM2 is connected to the first controller 180A, the first controller 180A executes a service event where the mobile terminal 100 is connected to the second mobile communication network 300 using user information of the second identity module SIM2 (S6).

The method of connecting identity modules of the mobile terminal can be executed through software. When the method is executed with software, various operations may be implemented using code segments for executing a necessary operation. The program or the code segments may be stored in a processor readable medium, or be transmitted by a computer data signal coupled to a carrier wave in a transmission medium or a communication network.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a first and a second identity module, each individually configured to store user information;
   a first controller configured to control wireless communication based on the user information stored on the first identity module through a first wireless communication unit;
   a second controller configured to control wireless communication based on the user information stored on the second identity module through a second wireless communication unit; and
   an identity module switch configured to:
   selectively connect either the first or second identity module to one of the first and second controllers;
   connect the other of the first or second identity module to the other of the first and second controllers; and
   in response to an event, disconnect the first identity module from the one of the first and second controllers, disconnect the second identity module from the other of the first and second controllers, and connect the second identity module to the one of the first and second controllers from which the first identity module was disconnected.

2. The mobile terminal of claim 1, wherein the first wireless communication unit comprises a first mobile communication module configured to connect to a first mobile communication network and at least one of a broadcasting reception module, a wireless Internet module, a short-range communication module, and a position information module.

3. The mobile terminal of claim 1, wherein the second wireless communication unit comprises a second mobile communication module configured to connect to a second mobile communication network.

4. The mobile terminal of claim 1, wherein the identity module switch is further configured to connect the first identity module to the first controller and the second identity module to the second controller.

5. The mobile terminal of claim 4, wherein:
   the event comprises a service event; and
   the identity module switch is further configured to disconnect the first identity module from the first controller, disconnect the second identity module from the second controller, and connect the second identity module to the first controller all without rebooting the mobile terminal.

6. The mobile terminal of claim 5, wherein the service event is at least a multimedia message, a short-range communication, a wireless Internet connection, a broadcast reception, or a position information receipt.

7. The mobile terminal of claim 5, wherein the identity module switch is further configured to, in response to the service event and without rebooting the mobile terminal, connect the first identity module to the second controller.

8. The mobile terminal of claim 4, wherein:
   the event comprises a user command; and
   the identity module switch is further configured to disconnect the first identity module from the first controller, disconnect the second identity module from the second controller, and connect the second identity module to the first controller all without rebooting the mobile terminal.

9. The mobile terminal of claim 8, wherein the identity module switch is further configured to, in response to the user command and without rebooting the mobile terminal, connect the first identity module to the second controller.

10. A method of connecting identity modules of a mobile terminal having first and second identity modules in which user information is stored, the method comprising:
    connecting the first identity module to a first controller for controlling wireless communication through a first wireless communication unit;
    connecting the second identity module to a second controller for controlling wireless communication through a second wireless communication unit; and
    switching the connections between the first identity module and the first controller and between the second identity module and the second controller.

11. The method of claim 10, wherein the first wireless communication unit comprises a first mobile communication module for connecting to a first mobile communication network and at least one of a broadcasting reception module, a wireless Internet module, a short-range communication module, and a position information module.

12. The method of claim 11, wherein the second wireless communication unit comprises a second mobile communication module for connecting to a second mobile communication network.

13. The method of claim 10, wherein switching the connections comprises, in response to a service event and without rebooting the mobile terminal, disconnecting the first identity module from the first controller, disconnecting the second identity module from the second controller and connecting the second identity module to the first controller.

14. The method of claim 13, wherein the service event is at least a multimedia message, a short-range communication, a wireless Internet connection, a broadcast reception, or a position information receipt.

15. The method of claim 13, wherein switching the connections further comprises, in response to the service event and without rebooting the mobile terminal, connecting the first identity module to the second controller.

16. The method of claim 10, wherein switching the connections comprises, in response to a user command and without rebooting the mobile terminal, disconnecting the first identity module from the first controller, disconnecting the second identity module from the second controller and connecting the second identity module to the first controller.

17. The method of claim 16, wherein switching the connections further comprises, in response to the user command and without rebooting the mobile terminal, connecting the first identity module to the second controller.

18. A mobile terminal comprising:
- a first identity module configured to store first user information to permit wireless communication with a first communication network;
- a second identity module configured to store second user information to permit wireless communication with a second communication network;
- a first controller configured to be selectively connected to either the first or second identity module, the first controller being configured to control wireless communication with the first communication network based on user information stored on the corresponding first or second identity module;
- a second controller configured to be selectively connected to the other of either the first or second identify modules, the second controller being configured to control wireless communication with the second communication network based on user information stored on the corresponding first or second identity module; and
- a switch configured to:
  - selectively connect the first identity module to one of the first and second controllers;
  - connect the second identity module to the other of the first and second controllers; and
  - in response to an event, disconnect the first identity module from the one of the first and second controllers, disconnect the second identity module from the other of the first and second controllers, and connect the second identity module to the one of the first and second controllers from which the first identity module was disconnected.

19. The mobile terminal of claim 18, wherein the switch is further configured to disconnect the first identity module, disconnect the second identity module and connect the second identity module without rebooting the mobile terminal.

* * * * *